United States Patent [19]

Birsa

[11] Patent Number: 4,878,475

[45] Date of Patent: Nov. 7, 1989

[54] FUEL SUPPLY SYSTEM FOR INTERNAL COMBUSTION ENGINES

[76] Inventor: Ludwig Birsa, 219 Fisher Ave., Rockdale, Ill. 60436

[21] Appl. No.: 274,233

[22] Filed: Nov. 21, 1988

[51] Int. Cl.⁴ .............................................. F02B 1/00
[52] U.S. Cl. .................................... 123/525; 123/577; 123/576
[58] Field of Search .................... 123/576, 577, 525

[56] References Cited

U.S. PATENT DOCUMENTS

| | | | |
|---|---|---|---|
| 4,068,639 | 1/1978 | Cook | 123/525 |
| 4,335,697 | 6/1982 | McLean | 123/525 |
| 4,369,751 | 1/1983 | Batchelor | 123/525 |
| 4,373,493 | 2/1983 | Welsh | 123/525 |

Primary Examiner—E. Rollins Cross
Attorney, Agent, or Firm—Ernest Kettelson

[57] ABSTRACT

A fuel supply system for internal combustion engines in which two different fuels are used, one to start the engine, to operate it at idling speed and to supplement the other fuel during acceleration, and the second to operate the engine at its normal working speed. The first fuel may be propane for starting, idling and for an acceleration supplement. The second fuel for normal working speed, or normal driving speed may be gasoline. A first vacuum controlled valve assembly delivers the first fuel such as propane from a pressurized supply tank to the carburetor below the conventional butterfly valve of the throttle control to start the engine and operate it at idle speed. A second vacuum controlled valve assembly delivers the first fuel, such as propane, to the carburetor above the butterfly valve only when the accelerator opens the throttle and its butterfly valve to initiate acceleration, and only during acceleration. The second fuel such as gasoline which is used for the normal working or driving operation is supplied to the engine in the usual manner, from its supply tank to the carburetor by a fuel pump, and from the carburetor through the intake manifold to the combustion chambers by the vacuum created as the engine operates.

10 Claims, 5 Drawing Sheets

FUEL SUPPLY SYSTEM FOR INTERNAL COMBUSTION ENGINES

Background of the Invention

This invention relates to the field of fuel supply systems for internal combustion engines and particularly to those which supply two different fuels to operate the engine.

Prior art systems of this kind include those disclosed in the following U.S. Pats.

U.S. Pat. No. 4,450,821 discloses a gaseous fuel delivery system to supplement the liquid fuel such as gasoline on which the engine normally operates, having a first vacuum and valve assembly which opens to supply gaseous fuel to start the engine and while idling and which then closes so no further gaseous fuel can be used to supplement the gasoline or other liquid fuel from the first vacuum and valve assembly; this system has a second vacuum and valve assembly to deliver gaseous fuel when the accelerator opens the throttle and butterfly valves wide enough but stops when eased back on the throttle to let the butterfly valve close back to its normal driving position even though it is desirable to continue delivery of supplemental fuel boost during the acceleration phase for an additional time period after beginning the ease back on the throttle.

U.S. Pat. No. 4,441,475 discloses a supplementary fuel system which adds propane to the intake passage of an engine which uses ethanol as its principal operating fuel, the propane being supplied to start the engine and aid in operation during low temperatures.

U.S. Pat. No. 4,370,969 discloses a propane air feed device for controlling measured quantities of propane gas which are pre-mixed with air before being delivered to the carburetor, and a control to adjust the air to fuel ratio depending on the changeover in propane and gasoline demands.

U.S. Pat. No. 2,701,133 discloses a propane or similar fuel supply system for internal combustion engines wherein a heat exchange coil is used to adjust and cool the temperature of the propane and which during colder weather can be used as a heat supply source for the vehicle on which it is used.

U.S. Pat. No. 4,308,843 discloses a supplemental system to supply gaseous fuel to the engine during that period between idle and initial acceleration wherein the initial drop in vacuum tends to temporarily close down the usual supply systems which control the flow of gaseous fuel to the engine by vacuum operated pressure regulators.

U.S. Pat. No. 4,393,848 discloses another fuel supply system for delivering two different fuels to the engine, in this case natural gas and gasoline. The system includes an operator controlled fuel selector switch to switch from one fuel to the other.

U.S. Pat. No. 4,425,898 discloses a gaseous fuel and air mixture device, comprising a mixing chamber mounted on the conventional carburetor having an axially adjustable plate to adjust the proportion of air admitted to the mixing chamber before going to the throat of the carburetor.

U.S. Pat. No. 4,068,639 discloses another combination fuel delivery system for operating an internal combustion engine on a blend of vapor fuel such as propane and gasoline, and having a main control valve which is driver operated manually by a hand knob one half of a second before the engine is cranked for starting.

The duel fuel system in accordance with the present invention provides several improvements over the prior art in that the small amount of propane needed for starting and operating the engine at idle speed can continue to flow as a supplement to the liquid fuel such as gasoline which is used for operation at normal driving speeds. It also pre-heats the carburetor and intake manifold area as well as combustion chamber area to about fifty defrees Fahrenheit before the vapor fuel such as propane is delivered to the carburetor, intake manifold and combustion chamber. This insures that all of the propane vapor will ignite when it reaches the combustion chambers and prevents any unignited vapor fuel from flowing past the combustion chambers to accumulate in the exhaust manifold and other parts of the exhaust conduit where it could explode.

The fuel system in accordance with this invention also provides a continuing supply of vapor fuel as a booster during the acceleration phase after the driver begins to let up on the accelerator but acceleration is still continuing although at a reduced rate of acceleration. In prior art systems which use vacuum controlled valves to deliver a temporary supply of vapor fuel to supplement the liquid fuel supply such as gasoline during acceleration, such valves open when the accelerator pedal is depressed to open the butterfly valve in the carburetor which causes a vacuum drop. However, as soon as the driver lets up on the accelerator pedal, the butterfly valve begins to close whereby the vacuum rises to immediatley close such valves and shut off the booster fuel supply before complete acceleration has been achieved. It is particularly important for vehicles such as large trucks that if a booster fuel is used for acceleration it does not cut out before acceleration has been completed. If while still accelerating but at a decreasing rate of acceleration the booster fuel is shut off so the engine is suddenly operating only on one single fuel such as gasoline, there could be an actual and unexpected deceleration at just the moment the additional boost may be needed such as to complete passing of a slower vehicle. The present invention eliminates that problem.

These and other advantages of the present invention will become apparent from the following detailed description and the accompanying drawings.

Summary of the Invention

It is an object of the invention to provide a fuel supply system for an internal combustion engine in which a fuel such as propane that burns with less pollution can be substituted for a fuel such as gasoline during those periods of engine operation in which exhaust pollution from a fuel such as gasoline is greatest.

It is an object of the invention to provide a fuel supply system for an internal combustion engine in which a vapor fuel such as propane is supplied to the engine for starting, for operation at idle speed, and to supplement a liquid fuel such as gasoline during acceleration to help reduce the amount of incompletely burned exhaust particles and hydrocarbons which otherwise result when an internal combustion engine operating solely on gasoline is accelerated under load.

It is an object of the invention to provide a fuel supply system for an internal combustion engine in which a supplemental fuel as propane used for starting and operation at idle can also be continuously fed in a controlled limited amount to supplement the primary fuel used for operating the engine at normal operating speeds.

It is an object of the invention to provide a fuel supply system for an internal combustion engine in which a vapor fuel is used to supplement another fuel and in which safety devices are provided to prevent unintended explosion of the vapor fuel outside of the combustion chambers of the engine.

It is an object of the invention to provide a fuel supply system for an internal combustion engine in which a vapor fuel is used to supplement another fuel and in which the area of the engine leading to the combustion chambers is pre-heated to a pre-selected temperature before delivering the vapor fuel to the combustion chambers for ignition to insure complete combustion thereof.

It is an object of the invention to provide a fuel supply system for an internal combustion engine in which a supplemental fuel is supplied during acceleration, including the period in which acceleration begins to taper off and the rate of acceleration is declining wherein vacuum build-up at such time shuts off vacuum controlled valves which open in response to vacuum drop requiring an additional system and components to continue to supply the supplemental fuel until acceleration even at declining rates of acceleration has been completed.

DESCRIPTION OF PREFERRED EMBODIMENT

A dual fuel system for internal combustion engines of vehicles in accordance with this invention uses propane gas to start the engine and operate the engine while idling, and a liquid fuel such as gasoline to operate the engine after the vehicle is under way. The propane gas is also fed to the carburetor and engine during acceleration to supplement the supply of gasoline.

Figure 1:
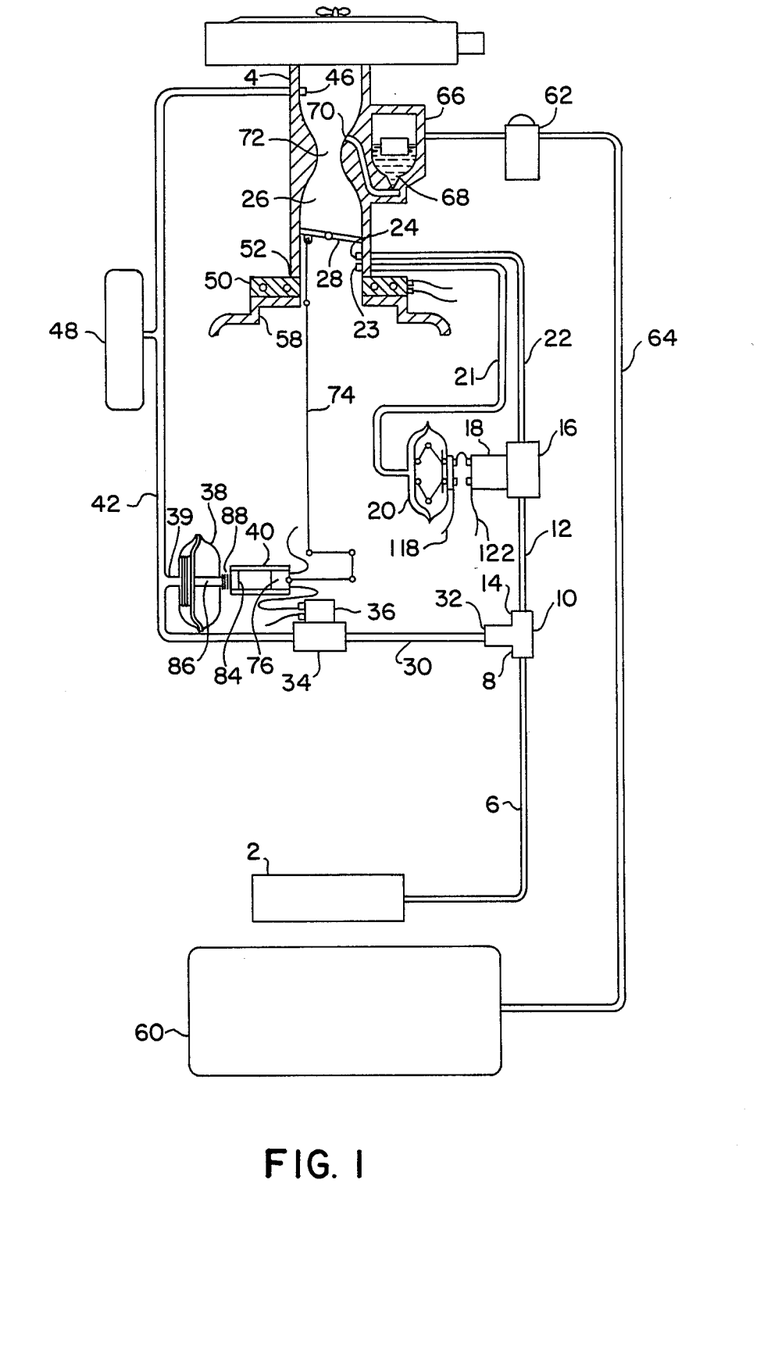
FIG. 1 is a section view of a carburetor in position over the intake manifold of an internal combustion engine, having a heater element in accordance with this invention interposed between and showing a gaseous fuel supply system in accordance with this invention connected to the carburetor, showing the relevant moving parts in position for starting the engine and while operating the engine at idle.

Propane gas is carried in a pressurized propane tank 2 and is fed to the carburetor 4 as follows. A first fuel line 6 leads from the propane tank 2 to the inlet port 8 of a tubular T-coupling member 10. A second fuel line 12 leads from a first outlet port 14 of the T-coupling member 10 to a first needle valve 16 operated by a first solenoid 18 which in turn is controlled by a vacuum switch 20. A third fuel line 22 leads from the first needle valve 16 to a first carburetor inlet port 24 opening to the throat 26 of the carburetor 4 below the butterfly valve 28.

A fourth fuel line 30 leads from a second outlet port 32 of the T-coupling member 10 to a second needle valve 34 operated by a second solenoid 36 which in turn is controlled by a vacuum operated pressure regulator 38 and sliding switch assembly 40. A fifth fuel line 42 leads from the second needle valve 34 to a second carburetor inlet port 46 opening to the throat 26 of the carburetor 4 above the butterfly valve 28.

The vacuum switch 20 is connected by a vaccum conduit 21 to a first vacuum outlet port 23 which opens to the throat 26 of the carburetor 4 below the butterfly valve 28. The pressure regulator 38 is connected by a vacuum conduit 39 to the fifth fuel line 42 and thereby to inlet port 46 which opens to the throat 26 of the carburetor 4 above the butterfly valve 28.

A ballast tank or collector tank 48 may be connected to the fifth fuel line 42 to receive and accumulate propane gas when the second needle valve 34 is opened for flow of propane through fuel line 42 to the carburetor 4. Part of the propane collects in the ballast tank 48 and is expelled therefrom after the second needle valve 34 closes to provide an additional supply of propane fuel to the carburetor 4 for a longer period of time after the initial acceleration which causes the second control valve 34 to open. Without the ballast tank 48 propane gas is delivered to the carburetor for only about fifteen seconds after initial acceleration, but for up to a minute with the ballast tank.

A resistance heating element 50 is positioned below the base 52 of the carburetor 4, connected to the battery 54 which powers the vehicle's electrical circuit, the heating element 50 being controlled by the heater switch 56.

The heater switch 56 is operated to make contact in the battery circuit and energize the heating element 50 before starting the engine, to heat the carburetor and adjacent portions of the engine to about fifty degrees Fahreheit. If propane gas is fed into the carburetor 4 and engine below that temperature, there is a possibility of unignited propane gas building up in the exhaust manifold and exhaust pipes which could result in an explosion and fire. When the carburetor 4 and intake manifold 58 are heated to fifty degrees Fahrenheit all of the propane gas fed through the carburetor, intake manifold and cylinders readily ignites in the combustion chambers of the cylinders thereby preventing any build up of unignited propane gas in the exhaust portions of the engine.

Figure 5:
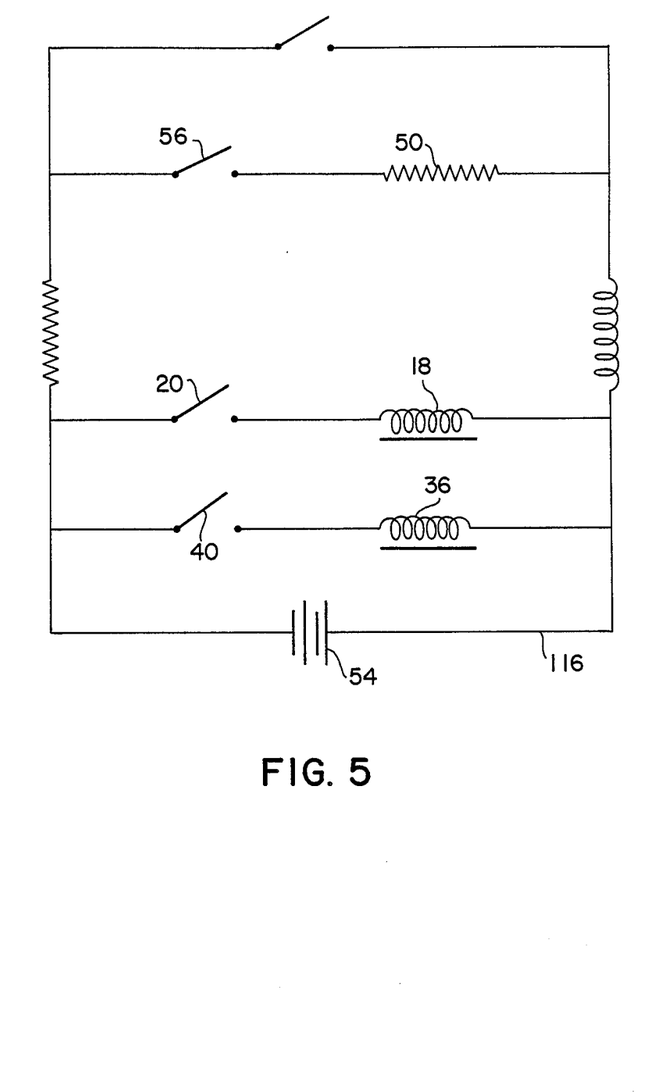
FIG. 5 is a schematic of the electrical circuit to energize the electrically powered components in accordance with this invention shown connected to the battery and electrical circuit of the vehicle on which it is mounted.

The solenoids 18 and 36 and the sliding switch assembly 40 are also connected in the vehicle's electrical circuit powered by the battery 54.

The propane gas is fed to the carburetor for starting, idling and acceleration. During normal driving operations, the vehicle is powered by gasoline delivered to the carburetor 4 from the gasoline tank 60 in the usual manner. A fuel pump 62 pumps gasoline from the gasoline tank 60 through the gasoline fuel line 64 to the gasoline fuel bowl 66 adjacent the carburetor 4 from which the gasoline is drawn in a conventional manner through the metering orifice 68 and gasoline port 70 leading to the venturi 72 in the throat 26 of the carburetor 4. The vacuum created in the throat 26 by operation of the engine and the venturi portion of the throat draws gasoline fuel from the fuel bowl 66, through the gasoline port 70, carburetor 4, intake manifold 58 and into the combustion chambers of the cylinders.

Gasoline is not delivered to the carburetor 4 during the starting operation and while the engine is idling. At idle speed, there is insufficient vacuum created in the throat 26 of the carburetor 4 to draw gasoline through the upwardly extending port 70 leading from the metering orifice 68 of the gasoline fuel bowl 66. Separate outlet ports from the gasoline fuel bowl 66 to the carburetor 4 for idling purposes are either not provided or are blocked off.

Operation of the propane fuel delivery system is as follows. The heating element 50 is first energized by closing the heater switch 56 until the carburetor and intake manifold temperature reaches fifty degrees Fahrenheit. The ignition circuit is then energized by closing the vehicle's ignition switch, depressing the starter to begin reciprocating the pistons and creating an initial vacuum in the intake manifold 58 and throat 26 of the carburetor 4 below the butterfly valve 28 which at such time is in the valve closed position. The accelerator pedal is not depressed at this time, the throttle and butterfly valve 28 remain biased to the valve closed position.

The vacuum created in the throat 26 below the butterfly valve 28 creates a corresponding vacuum through first vacuum conduit 21 in the vacuum switch 20 whose diaphragm responds to close the switch contacts and energize the first solenoid 18 which in turn operates and moves the first needle valve 16 to the valve open position. Propane can then flow from the pressured propane tank 2 through the first fuel line 6, T-coupling member 10, second fuel line 12, the needle valve 16, third fuel line 22 and first inlet port 24 opening to the throat 26 of the carburetor 4 below the butterfly valve 28, then through the intake manifold into the combustion chambers of the cylinders for ignition of the propane gas to start the engine.

The vacuum created by the engine while at idle is sufficient to hold the vacuum switch 20 in the contact closed position thereby keeping the first solenoid 18 energized and the first needle valve 16 in the valve open position to deliver a continuing supply of propane to the engine while idling.

The vacuum switch 20 has a diaphragm that is adjusted or selected to not respond until the vacuum through first vacuum conduit 21 is at least two pounds per square inch (psi). It will not respond to close the switch contacts that energize the first solenoid 18 which in turn opens the first needle valve 16 to deliver propane to the carburetor for starting until the vacuum is at least two psi, which is a safety feature that prevents any propane vapor from entering spark is available in the combustion chambers.

Figure 2:
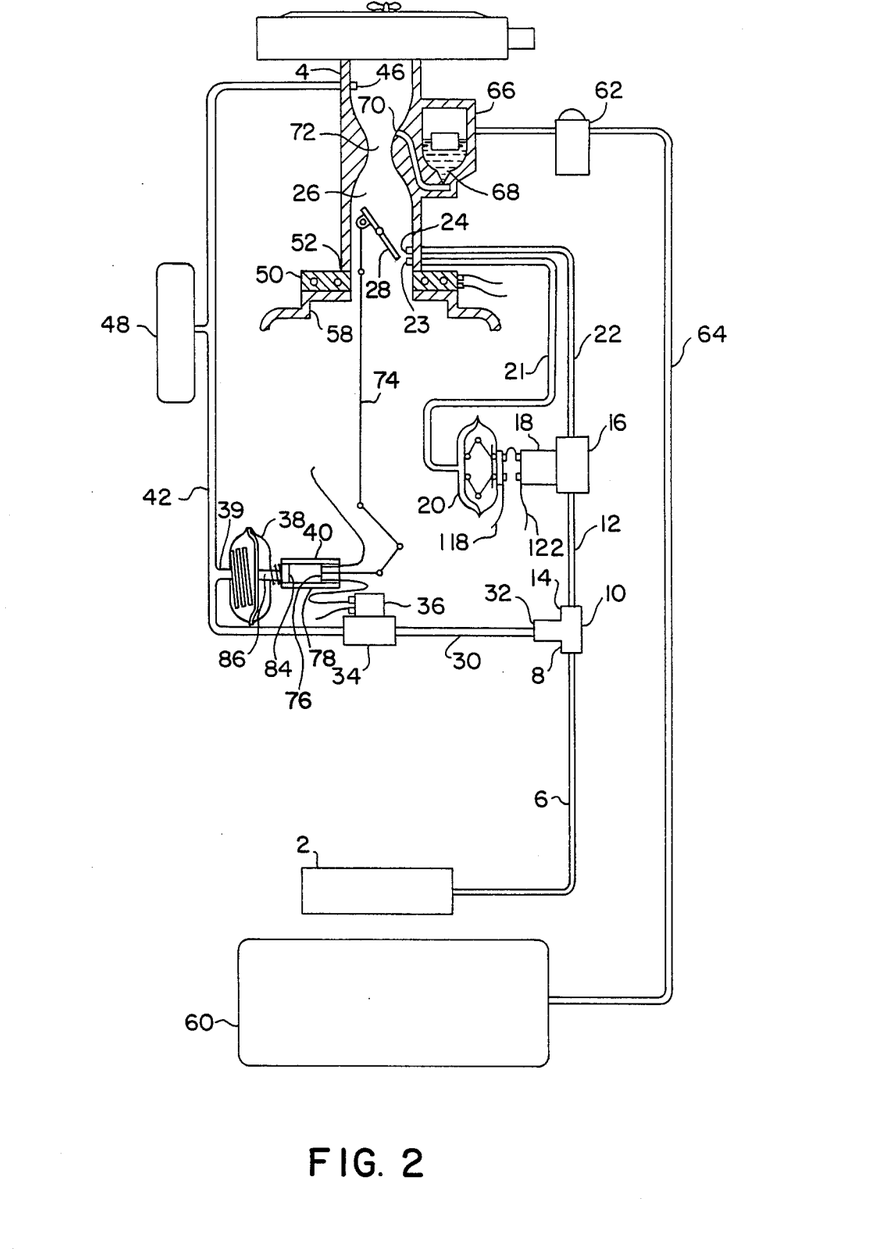
FIG. 2 is a section view of the carburetor as shown in FIG. 1 and of the other components shown in FIG. 1 but with the relevant moving parts in position when accelerating the engine.

After the engine is started and operating at idle and when ready to accelerate and begin moving the accelerator pedal is depressed to open the throttle and butterfly valve 28. The sliding switch assembly 40 is connected to the throttle and butterfly valve assembly 28 by a linkage assembly 74 whereby the contact carrying insert 76 of the sliding switch assembly 40 is driven forwardly in its barrel portion 78 for contact of its contacts 80 and 82 with the electrically conductive head 84 of a ram 86 that is mounted for reciprocal movement between an extended position and a retracted position by operation of the vacuum or pressure regulator 38. When the conductive head 84 makes contact with contacts 80 and 82 of the sliding switch assembly 40 which is connected in the vehicle's electrical circuit, the second solenoid 36 becomes energized to open the second needle valve 34 whereby propane can now flow through the fourth fuel line 30, solenoid operated valve 34, the fifth fuel line 42, and the second inlet port 46 for entry into the carburetor throat 26 above the butterfly valve 28.

During acceleration the vacuum in the carburetor throat 26 builds up to about eighteen pounds per square inch and levels off at that pressure during normal driving speed. When the vacuum builds up to that pressure, the same vacuum pressure extends through the fifth fuel line 42 and vacuum conduit 39 to the pressure regulator 38. At such time, the diaphragm of pressure regulator 38 draws the ram 86 toward its retracted position which also compresses the coil spring 88 through which the ram 86 extends. When the ram 86 is moved to its retracted position, its electrically conductive head 84 breaks contact with the contacts 80 and 82 of the sliding switch assembly 40 thereby de-energizing the second solenoid 36 and closing its associated needle valve 34 to stop further flow of propane from the T-coupling 10 through fuel line 30.

The flow of propane through fuel line 30 remains discontinued until the driver desires to accelerate from his existing highway speed. When he accelerates by depressing the accelerator pedal to open the throttle and butterfly valve assembly 28, the vacuum in the carburetor throat drops from about eighteen psi to about ten psi. The pressure regulator 38 is set for its diaphragm to respond and release the ram 86 for movement outward under the bias of coil spring 88 toward its extended position where its electrically conductive head 84 makes contact with contacts 80 and 82 of the sliding switch assembly 40.

At the same time, the linkage assembly 74 connected between the throttle and butterfly valve assembly 28 and the insert member 76 of the sliding switch assembly is driven forwardly toward the head 84 of the ram 86 until it makes contact therewith. That energizes the second solenoid 36 to open its associated needle valve 34 for propane to flow and enter the carburetor throat 26 through inlet port 46 thereby delivering a supplemental supply of propane to the gasoline already being delivered through gasoline port 70 to the carburetor throat 26. The supplemental supply of propane gives an added boost of fuel and power to the engine during acceleration. When the vacuum again builds up to about eighteen psi in the carburetor throat 26 and applied through the vacuum conduit 39 to the pressure regulator 38, its diaphragm draws the ram 86 back to its retracted position thereby breaking contact with the sliding switch assembly 40 when in turn de-energizes the second solenoid 36 and closes its associated valve 34 to stop further flow of propane through fuel line 30.

The ballast tank 48 which is connected in fuel line 42 collects some of the propane as it is flowing during the initial stage of acceleration, and propane continues to flow from the ballast tank 48 through fuel line 42 and inlet port 46 into the carburetor 26 for an additional period of time after the second solenoid operated valve 34 has been closed.

Without the ballast tank 48 connected, propane would flow from the second solenoid operated valve 34 to the carburetor throat 26 for only about fifteen seconds from the time of initial acceleration causing the throat vacuum to drop to the operating point of pressure regulator 38 of about ten psi, until the throat vacuum again builds up to its normal driving or operating level of about eighteen PSI at which time the pressure regulator's diaphragm draws the ram 86 to its retracted position breaking electrical contact and closing the second solenoid operated valve 34. When the ballast tank 48 is connected in the fuel line 42, propane continues to be delivered to the carburetor throat 26 and engine for about forty five seconds more after valve 34 has been closed, or a total of about one minute for the supplemental propane boost during acceleration. This time may be increased if needed to assure continuous supply of propane to the combustion chambers throughout the entire acceleration phase, including the time period when acceleration is continuing at a decreasing rate of acceleration, by using a larger ballast tank.

A small amount of propane continues to flow through the idling propane delivery system throughout all stages of operating the vehicle and until the engine is stopped. The idling delivery system comprises the first fuel line 6, T-coupling member 10, second fuel line 12, first needle valve 16 operated by the first solenoid 18, third fuel line 22 and first carburetor inlet port 24 below the butterfly valve 28. This amount of propane is relatively small, since needle valve 16 is adjusted to permit just enough flow of propane for starting and operating the engine at idling speed. Such supplemental flow of propane to the engine while being operated on the gasoline fuel aids in combustion and decreases exhaust pollution.

When starting and idling, the engine operates entirely on propane in accordance with this invention as described above. Since propane burns cleanly with little if any harmful exhaust residue, and since the greatest amount of exhaust pollution from gasoline occurs during the starting and idling operation, this invention would reduce the pollution from vehicle emissions to an almost insignificant problem if used on all vehicles. Incompletely burned exhaust particles and hydrocarbons are also excessive during acceleration of vehicles under load which use gasoline as the fuel, and the fuel supply system in accordance with this invention also minimizes such pollution significantly with this continuing supply of propane throughout the entire acceleration phase, including that portion of time when the rate of acceleration is decreasing.

Figure 3:
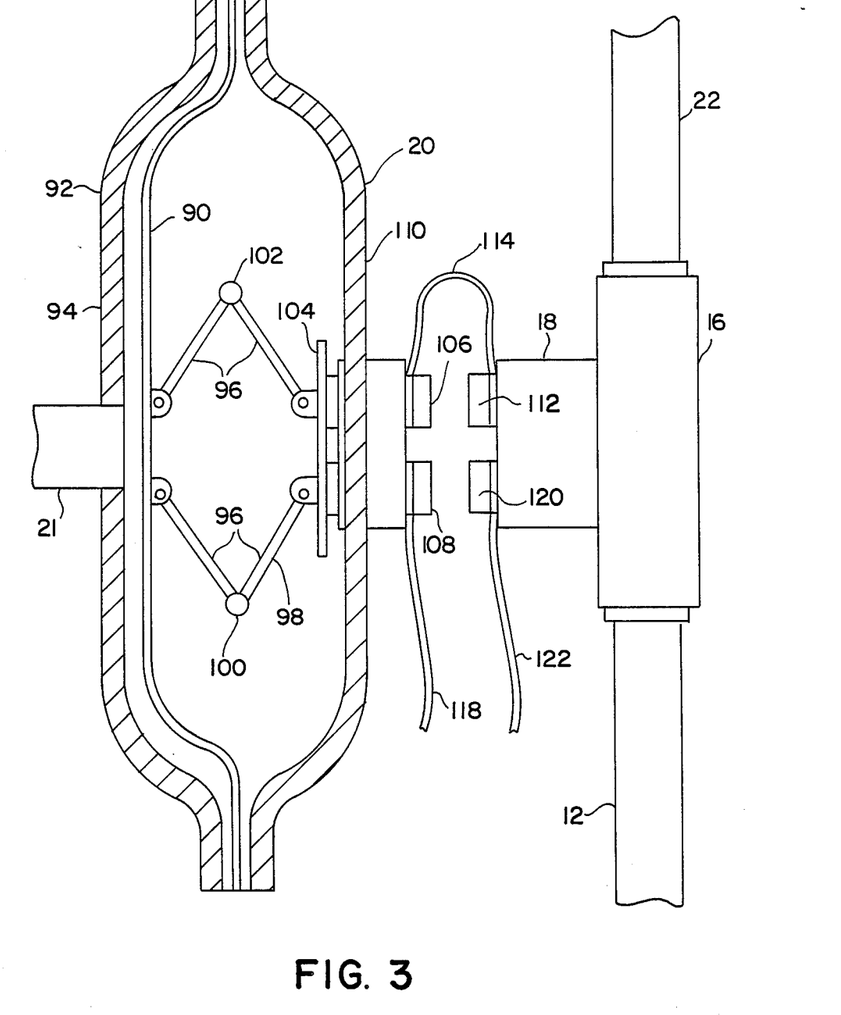
FIG. 3 is an enlarged section view of the vacuum switch and first solenoid operated needle valve in accordance with this invention which supplies gaseous fuel such as propane to the carburetor for startinig and while the engine is idling.

The vacuum switch 20 as shown in the enlarged section view of FIG. 3 includes a diaphragm 90 which is pulled toward the rear wall 92 of the switch housing 94 under high vacuum through vacuum conduit 21. The legs 96 of scissor link assembly 98 anchored on pivot pins 100 and 102 which extend across the switch housing 94 spread apart when the diaphragm 90 is pulled toward the rear wall 92 by vacuum through vacuum conduit 21 thereby pressing contact plate 104 against contacts 106 and 108 mounted on the front wall 110 of the housing 94 completing an electrical circuit between them. Contact 106 of the vacuum switch 20 is connected to contact 112 of solenoid 18 by conductor 114. Contact 108 of the vacuum switch 20 is connected to the vehicle electrical circuit 116 and its battery 54 through conductor 118. Contact 120 of solenoid 18 is connected to the vehicle electrical circuit and battery 54 through conductor 122. Thus, when contact plate 104 makes contact across vacuum switch contacts 106 and 108, an electrical circuit is completed to energize the solenoid 18 and open its associated needle valve 16. When vacuum in vacuum conduit 21 drops, the diaphragm 90 relaxes and moves forward toward the front wall 110 which causes the scissor link assembly 98 to bring its legs 96 together, moving contact plate away from contacts 106 and 108 thereby breaking the electrical circuit and de-energizing solenoid 18 whereby its associated needle valve 16 closes to prevent further flow of propane through fuel line 22.

Figure 4:
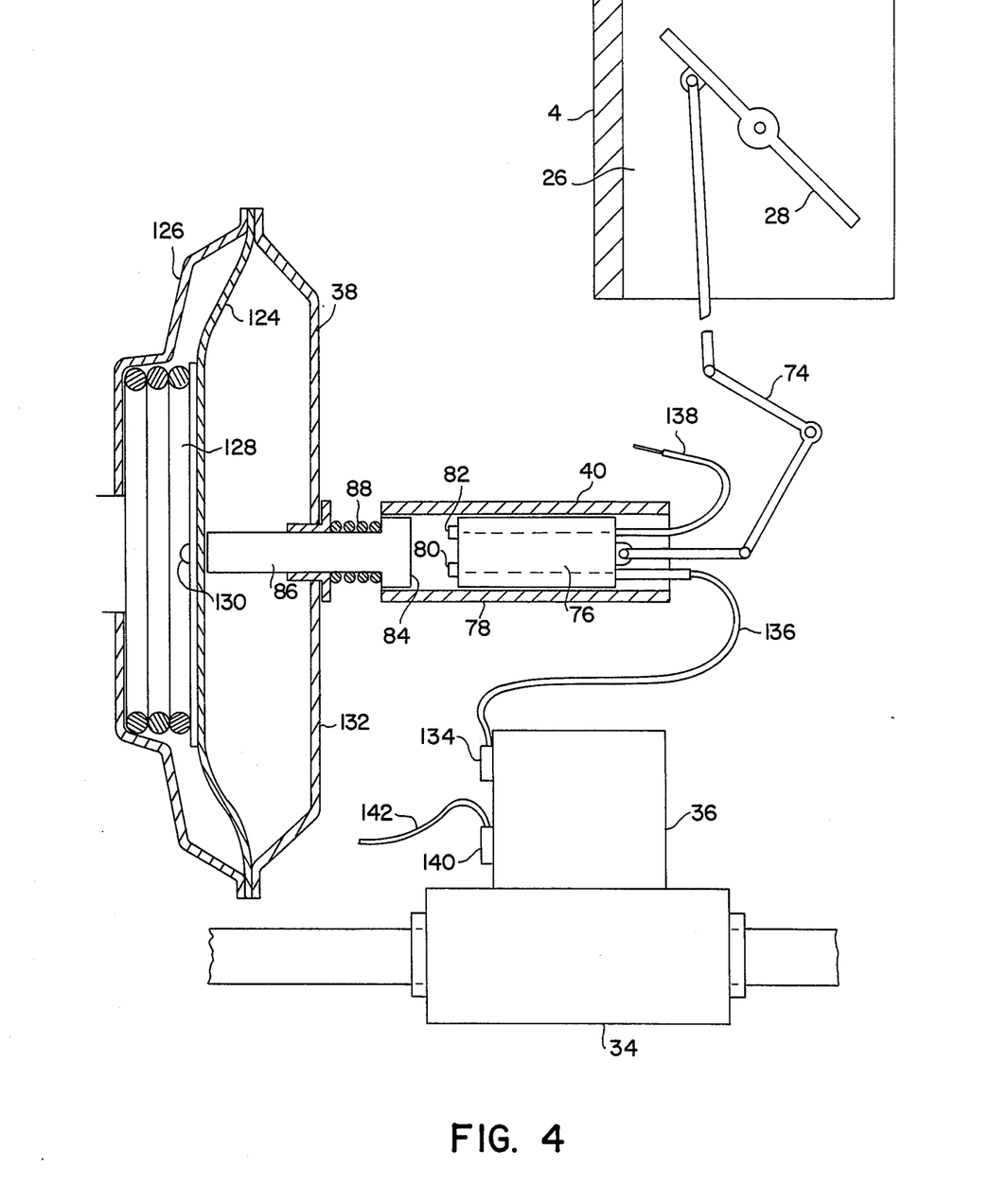
FIG. 4 is an enlarged section view of the pressure regulator, sliding switch assembly and second solenoid operated valve in accordance with this invention which supplies gaseous fuel such as propane to the carburetor when accelerating the engine.

The pressure regulator 38 is shown in the enlarged section view of FIG. 4 includes a diaphragm 124 which is pulled to the rear wall 126 of the regulator housing under high vacuum through vacuum conduit 39. This compresses coil spring 128 which is positioned between the diaphragm 124 and the rear wall 126. IT also draws the ram 86 connected to the diaphragm 124 by a screw 130 rewardly and compresses the coil spring 88 positioned on the portion of ram 86 which projects outwardly of the front wall 132 of the regulator housing.

When vacuum drops through vacuum conduit 39 as a result of acceleration and opening of the butterfly valve 28 in tne carburetor 4, the coil spring 128 biases the diaphragm 124 toward the front wall 132 and the coil spring 88 around the ram 86 bearing against its enlarged head 84 biases the ram toward the contact carrying insert 76 of the sliding switch assembly 40. That in turn is pushed toward the head 84 of ram 86 by the link assembly 74 connected to the throttle butterfly valve assembly 28. The combined action of spring biased diaphragm and spring biased ram toward the contact carrying insert 76 which in turn is pushed toward the electrically conductive head 84 of ram 86 results in very rapid electrical contact immediately on acceleration to energize solenoid 36 and open its associated valve 34 to supply propane rapidly to the carburetor and combustion chambers.

Contact 80 of the contact carrying insert 76 is connected to contact 134 of the solenoid 36 by conductor 136. Contact 82 of the contact carrying insert 76 is connected to the electrical circuit of the vehicle and battery 54 through conductor 138. Contact 140 of the solenoid 36 is connected to the electrical circuit of the vehicle and battery 54 through conductor 142. Thus when the electrically conductive head 84 of ram 86 makes contact across contacts 80 and 82 of the contact carrying insert 76, an electrical circuit is completed to energize solenoid 36 and open its associated valve 34.

I claim:

1. A fuel supply system for an internal combustion engine having at least one combustion chamber, comprising first fuel supply means to supply a first fuel to said combustion chamber for starting initial combustion therein, including said first fuel, and to continue to supply a limited amount of said first fuel to said combustion chamber throughout the entire operation of said engine until it is stopped, second fuel supply means to supply a second fuel to said combustion chamber during a specified and limited phase of said engine's operation, including said second fuel, acceleration means operative to begin supply of said second fuel to said combustion chamber after said initial combustion and to thereafter accelerate and decelerate supply of said second fuel to said combustion chamber, and third fuel suuply means to supply said first fuel to said combustion chamber from said third fuel supply means for a determinable limited time period in response to said acceleration means operating to accelerate supply of said second fuel to said combustion chamber, said first fuel and said second fuel being both supplied to said combustion chamber during such determinable limited period of time, said third fuel supply means discontinuing to supply said first fuel to said combustion chamber after such determinable limited period of time.

2. A fuel supply system for an internal combustion engine having at least one combustion chamber, a crankshaft, first rotation means to rotate said crankshaft prior to combustion of fuel in said combustion chamber, second rotation means to rotate said crankshaft in response to combustion of fuel in said combustion chamber, said fuel supply system comprising first fuel supply means to supply a first fuel to said combustion chamber, including said first fuel, second fuel supply means to supply a second fuel to said combustion chamber, including said second fuel, acceleration means operable to accelerate supply of fuel to said combustion chamber to accelerate rotation of said crankshaft, said first fuel means being operable to supply said first fuel to said combustion chamber for starting initial combustion therein before operation of said acceleration means and before said second fuel is supplied to said combustion chamber, said second fuel supply means being operable to begin supply of said second fuel to said combustion chamber in response to operation of said acceleration means after said initial combustion, and third fuel supply means to supply said first fuel to said combustion chamber for a determinable limited time period in response to operation of said acceleration means to accelerate supply of said second fuel to said combustion chamber and to accelerate rotation of said crankshaft, said third fuel supply means including stop means to discontinue supply of said first fuel to said combustion chamber by said third fuel supply means after said determinable limited time period.

3. A fuel supply system for an internal combustion engine as set forth in claim 2, wherein said first fuel supply means includes a pressurized supply tank for said first fuel, said first fuel in said pressurized supply tank being in vapor form, said first fuel supply means including first conduit means to carry said first fuel from said pressurized supply tank to said combustion chamber, first valve means connected in said first conduit means operable between a valve open and a valve closed position, first valve operating means to control operation of said first valve means, said first valve operating means including first vacuum means, said first vacuum means being responsive to cause said first valve means to move to said valve open position upon initial rotation of said crankshaft by said first rotation means and vacuum thereby created, said first fuel thereupon flowing to said combustion chamber under pressure of said pressurized supply tank to start said initial combustion in said combustion chamber.

4. A fuel supply system for an internal combustion engine as set forth in claim 3, wherein said internal combustion engine includes a carburetor having a first and second end and a passageway therebetween to receive fuel for delivery to said combustion chamber, an intake conduit between said carburetor and said combustion chamber to carry said fuel from said carburetor to said combustion chamber, said passageway of said carburetor opening to said intake conduit at said first end of said carburetor, said acceleration means including a throttle valve pivotally mounted in said passageway of said carburetor for pivotal movement between a passageway closed and passageway open position, said first conduit means of said first fuel supply means including a first fuel line having a first end connected to said first valve means and an opposite second end connected to said carburetor and opening to said passageway thereof at a point between said throttle valve and said first end of said carburetor, said throttle valve being normally biased to said passageway closed position, said acceleration means including an acceleration operator connected to said throttle valve to move said throttle valve from its said normally biased passageway closed position toward said passageway open position.

5. A fuel supply system for an internal combustion engine as set forth in claim 4, wherein said second fuel supply means includes a second fuel supply tank for said second fuel, second conduit means to carry said second fuel from said second fuel supply tank to said carburetor, said second conduit means including a second fuel line terminating at an intake port opening to said passageway of said carburetor between said throttle valve and said second end of said carburetor, said third fuel supply means includes third conduit means connected between said first conduit means and said carburetor to carry said first fuel to said carburetor in response to operation of said acceleration means to accelerate rotation of said crankshaft, second valve means connected in said third conduit means operable between a valve open and a valve closed position, valve operating means to control operation of said second valve means, said valve operating means including second vacuum means and cooperating contact means, said third conduit means includes a third fuel line having a first end connected to said second valve means and an opposite second end connected to said carburetor and opening to said passageway thereof at a point between said throttle valve and said second end of said carburetor.

6. A fuel supply system for an internal combustion engine as set forth in claim 5, wherein said second vacuum means includes a vacuum chamber having a rear wall and front wall, a diaphragm therein movable between a stressed position toward said rear wall when high vacuum is applied to said chamber and a relaxed position toward said front wall when low vacuum is applied to said chamber, a ram connected to said diaphragm for movement between a retracted position when said diaphragm is in said stressed position and an extended position when said diaphragm is in said relaxed position, said cooperating contact means including an electrical switch member mounted for reciprocal movement toward and away from said ram between a contact position and an out of contact position, said electrical switch member making electrical contact and becoming conductive when in contact with said ram, said electrical switch member being in contact with said ram when said ram is in said extended position and said contact switch member is moved toward said ram to said contact position, said electrical switch member being movable away from said ram while it is still in its said extended position to said out of contact position of said electrical switch member, and operating means connecting said electrical switch member to said throttle valve for movement of said electrical switch member toward said ram to said contact position when said throttle valve is pivoted toward its said passageway open position and for movement of said electrical switch member away from said ram to said out of contact position when said throttle valve is pivoted toward its said passageway closed position.

7. A fuel supply system for an internal combustion engine as set forth in claim 1, wherein said internal combustion engine is mounted in a vehicle, said third fuel supply means supplies said first fuel to said internal combustion engine during acceleration of said engine and said vehicle, including continuation supply means to continue supplying said first fuel to said internal combustion engine during the period acceleration is continuing at a decreasing rate of acceleration.

8. A fuel supply system for an internal combustion engine as set forth in claim 7, wherein said continuation supply means includes an accumulation container to receive and accumulate a portion of said first fuel while being supplied to said conmbustion chamber by said third fuel supply means for later and continuing supply of said first fuel to said combustion chamber from said accumulation chamber for a limited and determinable continuation period.

9. A fuel supply system for an internal combustion engine as set forth in claim 1, including a heater positioned to increase the temperature of the area of said internal combustion engine leading to said combustion chamber prior to supply of said first fuel to said combustion chamber to obtain complete combustion of said first fuel when received in said combustion chamber.

10. A fuel supply system for an internal combustion engine as set forth in claim 9, wherein said first fuel is propane and said heater raises said temperature of said area of said internal combustion engine leading to said combustion chamber to at least about fifty degrees Fahrenheit prior to supply of said propane to said combustion chamber.

* * * * *